O. P. HURFORD.
PROCESS OF EXTRACTING NITROGEN FROM AIR.
APPLICATION FILED SEPT. 15, 1906.
923,846.
Patented June 8, 1909.
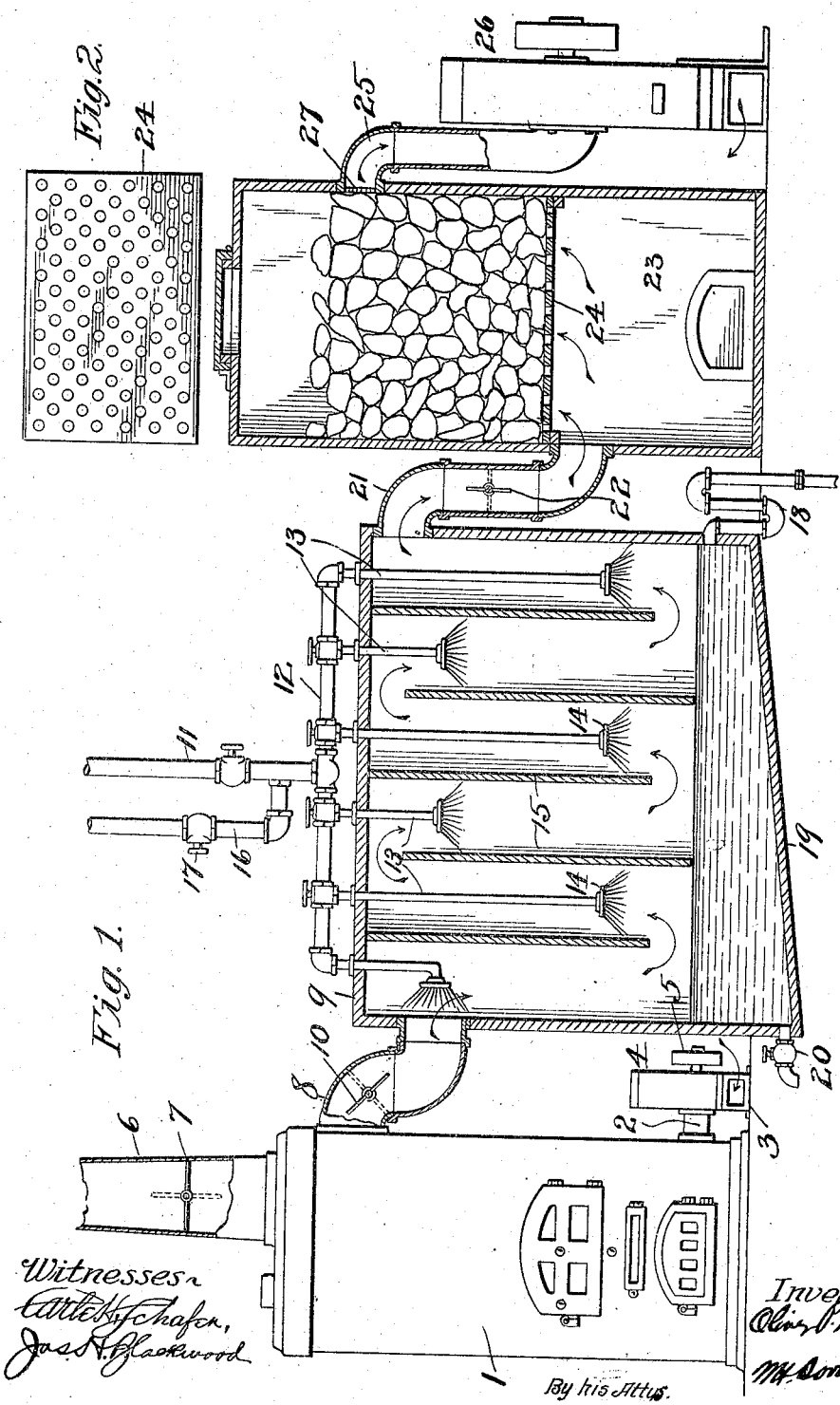

OLIVER P. HURFORD, OF CHICAGO, ILLINOIS.

PROCESS OF EXTRACTING NITROGEN FROM AIR.

No. 923,846.

Specification of Letters Patent.

Patented June 8, 1909.

Application filed September 15, 1906. Serial No. 334,732.

*To all whom it may concern:*

Be it known that I, OLIVER P. HURFORD, a citizen of the United States, residing at Chicago, in the county of Cook and State of Illinois, have invented certain new and useful Improvements in Processes of Extracting Nitrogen from Atmospheric Air, of which the following is a specification.

My invention relates to processes for extracting free nitrogen from the atmosphere and more particularly to improvements in the process described in my pending application Serial No. 277830. In that application there is set forth a process of extracting nitrogen from atmospheric air by introducing the air into a furnace supplied with suitable fuel, and subjecting carbon dioxid and other products produced by the combustion of the fuel to the action of a condenser to separate the nitrogen.

My present process relates particularly to means for neutralizing the acid nature of the solution during the spraying of the gaseous products by water, thus facilitating the condensation of the carbon dioxid, and to means for drying the nitrogen after it has been freed from such products.

To these ends my invention is embodied in the process hereinafter described and claimed.

In carrying out my process any suitable form of apparatus may be employed, but I prefer to use the apparatus herein illustrated and described.

The accompanying drawing shows in Figure 1 a side view in elevation, partly in section, of the complete apparatus, and in Fig. 2, a plan view of the perforated plate for holding the drying material in the absorption tower.

Referring now to the apparatus, 1 is a combustion furnace in which combustion of a suitable fuel, preferably bituminous or anthracite coal is maintained. The air is introduced into this furnace by a pipe 2 which first passes through a fan-casing 3 having a fan driven by pulley 4, whereby when it is desired, a forced draft may be maintained, for the purpose of increasing the combustion and proportionately increasing the absorption of carbon dioxid.

In order to permit impurities to escape, a chimney 6, having a damper 7, is provided. A sufficient heat is maintained and air under sufficient pressure forced into the furnace to produce substantially complete combustion, that is, such as will result in the production of carbon dioxid to the exclusion of carbon monoxid. From the furnace the gas is led through a pipe 8, having a damper 10, to a condensing tank 9, to which leads a water supply pipe 11, connecting to header 12, from which branch spraying pipes 13, having nozzles 14, extend. Partitions 15 are so arranged as to conduct the gases in a winding path against the sprays of water.

By this device the step of absorbing the carbon dioxid and condensing the steam or gaseous vapor from the furnace, is carried out, and the nitrogen thereby separated from the gases of combustion. The condenser has a non-corrodible lining to protect it against the action of the carbon dioxid and sulfurous and sulfuric acids in the water.

In the operation of this apparatus under certain conditions, the introduction through the spraying apparatus of calcium hydroxid in water is of advantage. The water may be loaded with lime either as lime water, or with lime in a fine state of suspension, known as milk of lime. The lime thereby introduced in the condensing chamber may serve the useful purpose of neutralizing the acid nature of the resulting solution and facilitate the condensation of the carbon dioxid, this being accomplished through the union of the carbon dioxid in the gas with the lime, forming a precipitate of calcium carbonate. Such proportion of this precipitate which is not soluble in the solution may accumulate as a sludge in the bottom of the condenser, and it is essential that provision be made for the accumulation of this sediment and an outlet for periodically drawing it off. A pipe 16, serves to introduce this lime charged water into the main supply and such pipe is provided with a controlling valve 17. An overflow pipe 18, which is always open, serves to draw off the water and with it the carbon dioxid which is carried by the water in solution. The tank has a slanting bottom 19, and sediment withdrawal pipe 20. After the nitrogen has been freed of the other constituents as far as is desired in the condenser, it is passed through a channel into an absorption tower, the purpose of which is to remove the entrained moisture which may come over from the condensing chamber. In this drying tower, lime, fused calcium chlorid, or other suitable drying agent may be used. After passing through this drying tower the nitrogen in a state of commercial purity is delivered by means of a blower into storage tanks or directly to apparatus for the production of nitrogen compounds.

The pipe or channel referred to is designated by the numeral 21, and 22 is the throttling or regulating valve in said pipe. The absorption tower 23, is provided with a perforated plate 24 adapted to support the lime or other drying agent and the nitrogen is carried up through the perforations in this plate and through the drying medium. An outlet pipe 25, leads to the blower 26, and a grille 27, is placed at the junction of this pipe with the tower for the purpose of preventing the lime or other material from falling into the pipe 26.

Although I have particularly described a certain form of apparatus for carrying out the various steps of my process, it is clear that the construction of the various parts of this apparatus may be varied and yet the same process effected.

Having thus described my invention what I claim is:

1. The process of obtaining free nitrogen from the air which consists in first burning a carbonaceous fuel in the presence of air of sufficient quantity for complete combustion to carbon dioxid and practically free from carbon monoxid, then subjecting the gaseous products to the condensing action of water and also passing them in contact with calcium hydroxid in water to condense the steam and separate the carbon dioxid from the nitrogen and neutralize the acid in the solution and then leading off the nitrogen from the condensing chamber, substantially as described.

2. The process of obtaining free nitrogen from atmospheric air which consists in burning a carbonaceous fuel by admitting air in amounts sufficient for complete combustion of the fuel, leading the gaseous products of combustion only when the same are practically free of carbon monoxid from the combustion chamber directly to a suitable condensing chamber, and drawing the gases through said chamber in a continuous stream in contact with a continuously flowing supply of water in finely divided sprays, subjecting the gases also to the action of lime water, whereby the carbon dioxid is rapidly absorbed and the steam condensed, and the acid in the solution neutralized, and then leading off the nitrogen, substantially as described.

3. The process of obtaining nitrogen from atmospheric air which consists in burning a carbonaceous fuel, admitting air in amounts sufficient for complete combustion in carbon dioxid and practically without carbon monoxid, leading the gaseous products free from such carbon monoxid directly to a condensing chamber and entraining said gases in a wave-like movement against separated finely divided sprays of lime-charged water continuously supplied to the chamber to condense the steam and to rapidly and continuously absorb the carbon dioxid and to neutralize the acid in the solution, and then drawing off the separated nitrogen, substantially as described.

In testimony whereof I have signed my name to this specification in the presence of two subscribing witnesses.

OLIVER P. HURFORD.

Witnesses:
HATTIE L. SCHNEIDER,
NICHOLAS SCHNEIDER.